United States Patent [19]

Mead et al.

[11] 4,203,201

[45] May 20, 1980

[54] METHODS FOR MAKING LITHIUM-IODINE CELL

[75] Inventors: Ralph T. Mead, Kenmore; Wilson Greatbatch, Clarence; Frank W. Rudolph, Depew; Norbert W. Frenz, Jr., North Tonawanda, all of N.Y.

[73] Assignee: Wilson Greatbatch Ltd., Clarence, N.Y.

[21] Appl. No.: 921,905

[22] Filed: Jul. 5, 1978

Related U.S. Application Data

[62] Division of Ser. No. 812,641, Jul. 5, 1977, Pat. No. 4,128,703.

[51] Int. Cl.² .................................................. H01M 6/18
[52] U.S. Cl. .................................... 29/623.1; 29/623.2
[58] Field of Search ................. 29/623.1, 623.2, 623.5; 429/101, 185, 199, 213, 218, 120, 178, 181, 184, 185, 191, 192

[56] References Cited

U.S. PATENT DOCUMENTS

| | | | |
|---|---|---|---|
| 3,723,183 | 3/1973 | Greatbatch | 429/199 |
| 3,817,791 | 6/1974 | Greatbatch et al. | 429/101 |
| 3,874,929 | 4/1975 | Greatbatch | 429/181 |
| 3,937,635 | 2/1976 | Mead et al. | 429/199 |
| 3,957,533 | 5/1976 | Mead et al. | 429/213 |
| 3,994,747 | 11/1976 | Greatbatch et al. | 429/199 |
| 3,996,066 | 12/1976 | Mead et al. | 429/213 |

*Primary Examiner*—Daniel C. Crane
*Attorney, Agent, or Firm*—Christel, Bean & Linihan

[57] ABSTRACT

A lithium-iodine cell comprising a casing of electrically conducting material, an anode including a lithium element within the casing, an electrical conductor operatively connected to the lithium element and extending out from the casing, and a cathode comprising iodine-containing material in operative contact with both the casing and the lithium element. The anode electrical conductor is completely sealed from the rest of the cell, and the casing serves as the cathode current collector. The anode operative surface is provided with a coating of an organic electron donor material. The anode is enclosed within an insulator element within the casing and a ferrule having one end within the insulator and the other end extending from the casing.

11 Claims, 4 Drawing Figures

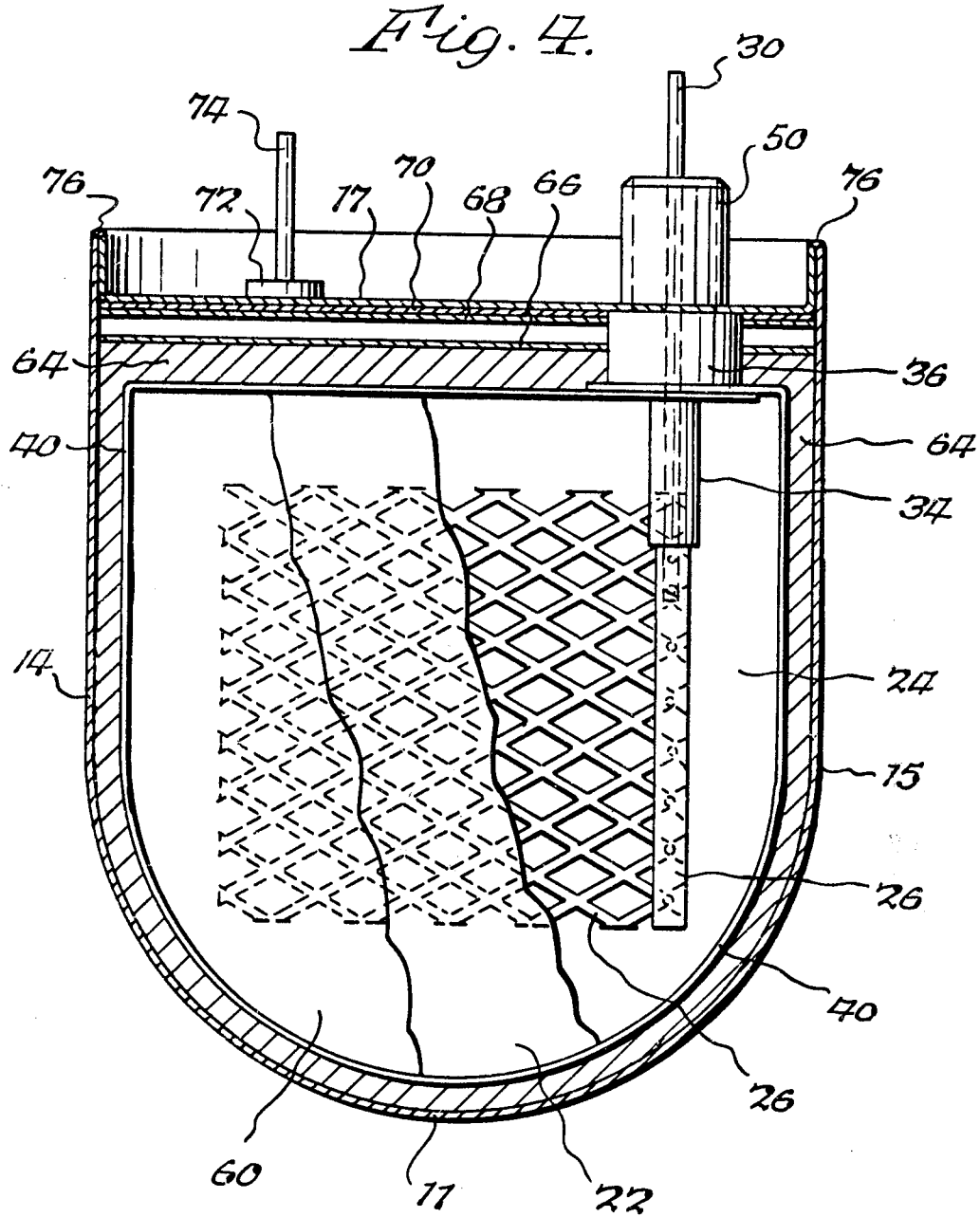

METHODS FOR MAKING LITHIUM-IODINE CELL

This is a division of application Ser. No. 812,641 filed July 5, 1977, now U.S. Pat. No. 4,128,703 issued Dec. 5, 1978.

BACKGROUND OF THE INVENTION

This invention relates to the conversion of chemical energy to electrical energy, and more particularly to a new and improved construction for lithium-iodine cells.

One area of use of the present invention is in providing electrical power to inaccessible devices in the human environment, for example to an implanted cardiac pacemaker, although the principles of the present invention can be variously applied. Lithium-iodine batteries are available for such use which advantageously have an open circuit voltage about twice that of the mercury cell, do not generate gas during operation, and have a non-corrosive electrolyte. The nature of the iodine-containing material such as an iodine complex is that it can tend to flow within the cell and possibly form a short circuit path between the anode collector lead and cathode. It is important to prevent such leakage, not only to maintain cell operation but also to prevent harm to a human body in which the cell may be implanted. It also is desirable to provide a cell having relatively high energy density.

SUMMARY OF THE INVENTION

It is, therefore, an object of this invention to provide a new and improved construction for a lithium-iodine cell.

It is a further object of this invention to provide such a cell having a relatively high energy density.

It is a further object of this invention to provide such a cell wherein the anode current collector is completely sealed or shielded from the iodine-containing cathode material and from the cell outer casing.

It is a further object of this invention to provide such a cell wherein the lithium area therein is relatively large and the overall cell size is relatively small.

It is a further object of this invention to provide such a cell which has relatively few parts and requires a relatively short time to assemble.

The present invention provides a lithium-iodine cell comprising a casing of electrically conducting material, anode means including a lithium element within the casing, electrical conductor means operatively connected to the lithium element and extending out from the casing, and cathode means comprising iodine-containing material within the casing and contacting the lithium element. The casing serves as a cathode current collector, and the operative surface of the lithium anode element is provided with a coating of an organic electron donor material. The anode conductor means is completely sealed from the rest of the cell by means including an insulator element of material which is non-reactive with iodine enclosing the conductor within the casing and a ferrule element enclosing the conductor having a portion within the casing and a portion extending from the casing. The cathode material comprises a charge transfer complex of an organic electron donor material and iodine. During assembly the material can be introduced in heated form to the casing or can be introduced in solid form to the casing and then heated.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 4 is a sectional view taken about on line 4—4 in FIG. 1.

DETAILED DESCRIPTION OF THE ILLUSTRATED EMBODIMENTS

Figure 1:
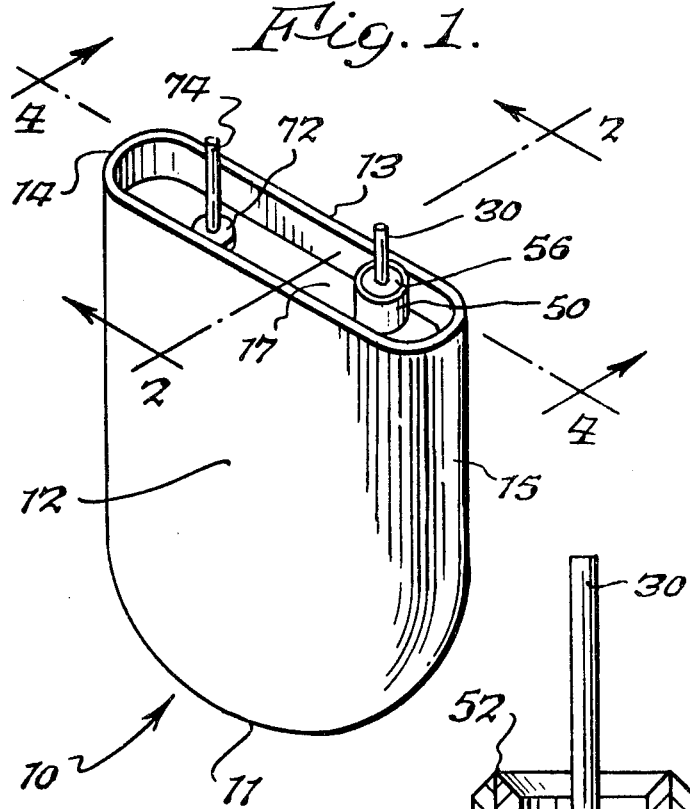
FIG. 1 is a perspective view of a lithium-iodine cell according to the present invention.

Referring now to FIG. 1, a lithium-iodine cell according to the present invention comprises a casing 10 of metal such as stainless steel which preferably is shaped or otherwise formed to be hollow and generally rectangular in shape of an integral construction including a curved bottom portion 11, spaced-apart planar side wall portions 12, 13 extending from the bottom portion, and spaced-apart curved end wall portions 14, 15 also extending from bottom portion 11 and joining corresponding ones of the side wall portions 12, 13. The bottom portion 11 is of compound curvature in that it is curved both in a direction between the side wall portions 12, 13 and also is curved in a direction between the end wall portions 14, 15. The curvature of bottom portion 11 between side portions 12, 13 is of the same degree as the curvature of the end wall portions 14, 15 thereby defining a continuous, curved surface around along the casing. The side wall portions 12, 13 are generally parallel. Casing 10 has an opened top or end opposite the bottom portion 11 which is sealed closed by means of a lid 17 also of metal such as stainless steel after the cell has been assembled as will be described in detail presently.

Figure 2:
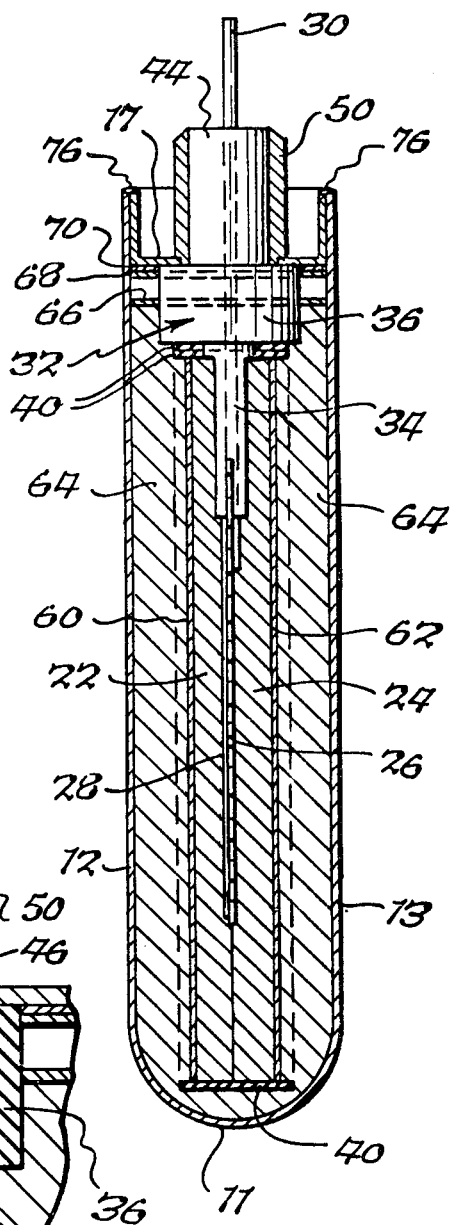
FIG. 2 is a sectional view taken about on line 2—2 in FIG. 1.
Figure 3:
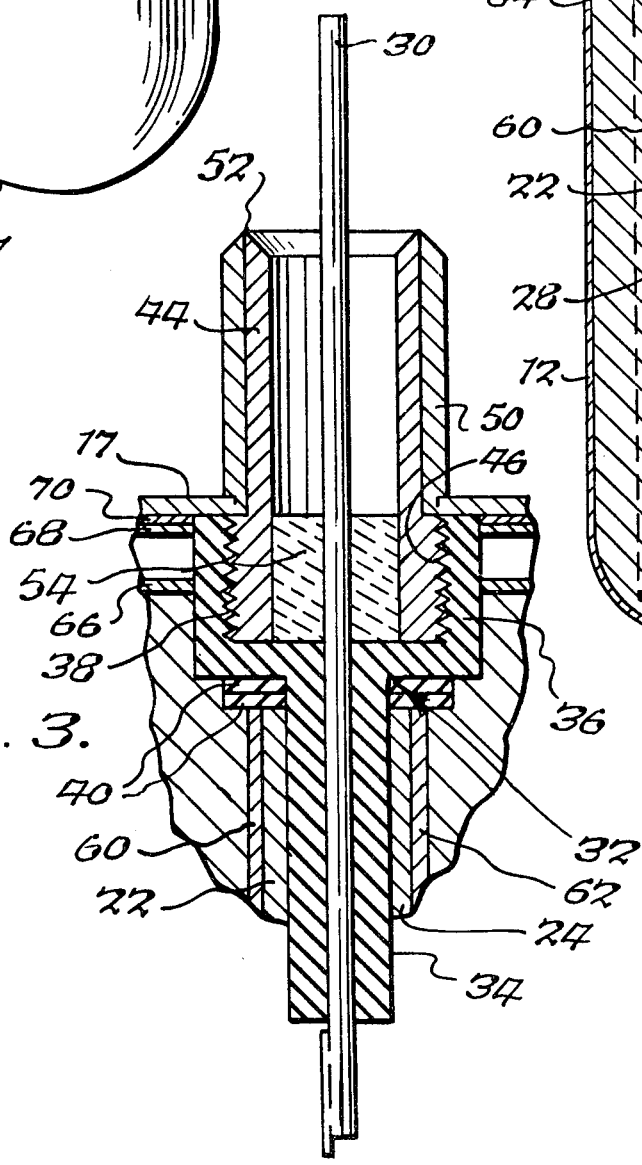
FIG. 3 is a fragmentary sectional view of a portion of the cell of FIG. 1.

Referring now to FIGS. 2-4, the cell of the present invention further includes anode means comprising a pair of lithium elements or plates 22, 24 having an anode current collector element 26 sandwiched or positioned therebetween. As shown in detail in FIG. 4, current collector 26 is relatively thin, preferably a sheet of no. 12 mesh zirconium metal. A conductor strip 28 of nickel or suitable metal is spot welded to collector element 26 along one edge thereof, and an electrical conductor 30 which can be of nickel, platinum or other suitable metal is welded at one end to the strip 28 and is of sufficient length allowing it to extend out from casing 10 for making electrical connection thereto.

Conductor 30 is sealed from the remainder of the cell by means including an insulator element generally designated 32 which surrounds lead 30 and which has a first portion 34 which is sandwiched between the plates 22, 24 and a second body portion 36 which is of larger cross section, preferably cylindrical, and located between the lithium plates and lid 17 when the cell is completed. The interior of portion 36 is provided with threads 38 for a purpose to be described. The insulator 32 is of a material which in addition to being a non-conductor of electricity also is non-reactive with iodine, i.e. does not exhibit electronic conduction when exposed to iodine. One form of material found to perform satisfactorily is a fluoropolymer material commercially available under the name Halar, a trademark of the Allied Chemical Company. Of course, other materials having these characteristics can be used for the insulator 32.

The anode assembly comprising the lithium elements 22, 24 and current collector 26 is fitted within an anode holding means or frame in the form of a strap 40 which embraces the anode assembly in a manner exposing at least one lithium surface. Strap 40 is of the aforementioned Halar material or any similar material which is non-reactive with iodine. In the present illustration, strap 40 surrounds the peripheral edges of the lithium elements 22, 24 or plates in a snug, sealing relationship. The opposite ends of strap 40 are provided with apertures of a size sufficient to receive the insulator portion 34, and these ends are overlapped adjacent the juncture of insulator portions 34 and 36 as shown in FIG. 4. A first or inner ferrule 44 of metal such as stainless steel encloses a further portion of lead 30. Ferrule 44 is provided with threads 46 along the outer surface adjacent one end thereof which is threaded into the insulator portion 36. Ferrule 44 is of generally hollow cylindrical shape with substantially constant diameter and slightly greater wall thickness along the portion containing threads 46. Lead 30 extends through ferrule 44 along the longitudinal axis thereof and spaced substantially equidistant from the inner surface of ferrule 44.

A second ferrule 50 of metal such as stainless steel surrounds the unthreaded or upper portion of ferrule 44 as viewed in FIG. 3 in concentric relation. The inner cylindrical surface of ferrule 50 contacts the outer cylindrical surface of ferrule 44, and ferrule 50 is secured such as by welding to lid 17 around an opening provided therein. The outer edges of ferrules 44, 50 are inclined at angles of about 45 degrees which meet at an apex defining a sharp annular edge 52. This bevel edge 52 is merely a convenience and not a necessary part of the cell. A cylindrical seal element 54 of glass having an axial bore to receive conductor 30 is fitted within ferrule 50 at the end contacting insulator 32. Seal 54 has an axial length approximately equal to the axial length of the portion of ferrule 44 containing threads 46.

One illustrative method of forming the anode assembly is as follows. First there is provided a subassembly including lead 30 within the combination of insulator 32 and ferrule 44. Strap 40 then is assembled into place with the ends overlapped to align the openings therein which then are fitted onto insulator portion 34. The overlapping ends joined to insulator portion 34 can be sealed in place with a suitable cement which is non-reactive with iodine such as a cyanoacrylate cement commercially available under the name Permabond 101. Similarly, the junction between insulator portion 36 and the bottom portion of ferrule 44 can be cemented. Current collector 26, conducting strip 28 and the end of lead 30 are spot welded together whereupon the lithium plates 22, 24 are positioned within strap 40 on opposite sides of the collector element 26 and insulator portion 34. The subassembly then is placed within a suitable fixture or support and is pressed together with a suitable force, for example about 3,000 lbs. The current collector 26, strip 28, insulator portion 34 and the portion of lead 30 contained therein are sealed within the lithium elements 22, 24. The material of strap 40 is pressure bondable to lithium with the result that the peripheral juncture at the edges of the lithium elements 22, 24 is enclosed or sealed by the strap 40. If desired, the junction between the inner surface of strap 40 and the periphery of lithium elements 22, 24 can be sealed further by the aforementioned cement. The completed anode assembly thus has two exposed surfaces which are oppositely directed or disposed.

When the anode assembly is completed, the exposed surfaces of lithium elements 22 and 24 are provided with coatings 60 and 62, respectively, of an organic electron donor component material, and the nature of the coatings 60, 62 and their role in the cell of the present invention will be described in further detail presently. The completed anode assembly is positioned in casing 10 as shown in FIGS. 2 and 4, with the anode operative surfaces spaced from the inner surface of casing 10. The cell of the present invention further comprises an iodine cathode including a region of cathode material 64 within casing 10 and operatively contacting the exposed surfaces of the lithium elements 22, 24 and operatively contacting the inner surface of casing 10. Casing 10, being of electrically conducting material, serves as a cathode current collector. According to a preferred mode of the present invention, the cathode material 64 comprises a charge transfer complex of an organic electron donor component material and iodine. The electron donor can be any organic compound having a double bond or an amine group. The electron donor functions to give the iodine sufficient conductivity for proper cell operation. A preferred form of the organic electron donor component is polyvinyl pyridine polymer and, in particular, two-vinyl-pyridine polymer.

The cell of the present invention further comprises an element 66 of heat conducting material such as stainless steel or other suitable metal positioned in casing 10 above cathode material. Element 66 is planar and relatively thin and is located in contact with the cathode material 64 and disposed generally perpendicular to casing sidewalls 12, 13. Element 66 is of a peripheral outline or shape and size so as to fit snugly within casing 10 and can be welded in place if desired. Element 66 serves as a heat sink to protect the remainder of the components within casing 10 from heat during welding of lid 17 into place. The cell of the present invention also includes a pair of elements 68, 70 of mica or similar material of shape and size substantially identical to element 66, and elements 68, 70 serve as a radiation barrier to protect the remainder of the components within housing 10 during welding of lid 17 in place. Elements 68, 70 are disposed substantially parallel to element 66 and located adjacent lid 17 and in contact therewith. A terminal element comprising a base 72 and shaft or pin portion 74 is spot welded to lid 17. The element preferably is of nickel and serves as an electrical terminal inasmuch as the casing 10 serves as a cathode current collector. Lid member 17 is fitted into place in the open end of casing 10 and is welded at 76 around the peripheral edge thereof to the corresponding edge of casing 10.

The cell of the present invention can be fabricated in the following manner. An anode assembly is prepared as described hereinabove, and ferrule 44 is connected into insulator portion 36 by engagement between threads 38, 46. The parts can be sealed together by the aforementioned Permabond 101 cement. Lid 17 is placed on the anode assembly with ferrule 44 fitting through the lid aperture whereupon ferrule 50 is fitted over ferrule 44 and welded at the one end to lid 17. The seal element 54 is provided at a prior stage of assembly. The radiation shield elements 68, 70 are fitted in place on insulator portion 36 and adjacent the undersurface of lid 17. The heat sink element 66 then is fitted on and secured to insulator portion 36.

One mode of fabrication includes pouring heated cathode material or depolarizer into casing 10, placing the anode-lid combination in the casing, and then welding lid 17 to casing 10 around the periphery thereof. In particular, the cathode material or depolarizer is prepared by heating the organic material, i.e. 2-vinyl pyridine polymer, mixed with iodine, to a temperature greater than the crystallization temperature of iodine, for example about 300° F. The amount of iodine should be greater than about 50 percent by weight of the resulting mixture so that enough iodine is available in the cathode material to provide sufficient conductivity for proper cell operation. The resulting mixture is a viscous, flowable substance which can be introduced to cell casing 10 in the following manner. The empty casing is held in an upright position, such as by means of a suitable fixture or holder, whereupon the heated cathode material or depolarizer is poured into the casing through the open top thereof. The amount of material 64 introduced to casing 10 is sufficient to contact the exposed surfaces of the lithium elements 22, 24 and to reach a level at or adjacent the inner or lower surface of heat sink element 66 when the anode-lid combination is inserted into casing 10 containing material 64. After the anode-lid combination is inserted and fitted in place, the periphery of lid 17 is welded to casing 10 in the manner previously described.

Another mode of fabrication includes placing preformed solid elements of the cathode material or depolarizer along with the anode-lid combination into casing 10 and then heating the assembly to melt the solid elements of cathode material to insure adequate contact with the inner surface of casing 10 and the lithium anode elements. In particular, the cathode material or depolarizer is prepared by heating the organic material, i.e. 2-vinyl pyridine polymer, mixed with iodine, to a temperature greater than the crystallization temperature of iodine, for example about 300° F. The amount of iodine should be greater than 50 percent by weight of the resulting mixture so that enough iodine is available in the cathode material to provide sufficient conductivity for proper cell operation. The resulting mixture, a viscous flowable substance, is poured into molds of Teflon or in similar material which is non-reactive with iodine. Each mold is shaped to define a solid element or pellet of cathode material which will fit relatively closely between the outer surface of a lithium anode element and the opposite inner surface of casing 10. In particular, each mold is shaped to define a pellet having planar generally parallel side surfaces adapted to contact the surfaces of the lithium element and casing, a generally planar top surface, side edge surfaces curved to conform to the inner surface portions of casing wall portions 14, 15 and a bottom edge surface curved to conform to the inner surface portion of casing bottom portion 11. Two solid elements or pellets of cathode material are formed for each cell. The heated cathode material is allowed to cool in the mold and then the resulting pellet is removed from the mold and placed in a region such as a refrigeration chamber at a temperature of 0° F. ±10°. The pellets are kept in this region for a sufficient time, for example about one hour, enabling the pellets to reach the temperature of 0° F. ±10°. Two frozen pellets along with the anode lid combination are inserted into casing 10, the pellets being located between the outer surfaces of the anode lithium elements and the inner surface of the casing. The assembly then is subjected to a temperature sufficient to melt the pellets causing the cathode material 64 to be in a viscous, flowable state. For example, this is done at a temperature of about 200° F.–220° F. for about one hour. This insures that the cathode material 64 is in maximum contact with the operative surfaces of the anode lithium elements and with the inner surface of casing 10. The foregoing method simplifies assembly with relatively small-sized casings, insures that the upper edge surface of casing 10 remains clean for the subsequent welding of lid 17 in place, and has the further example of being relatively quick.

The lithium-iodine cell according to the present invention operates in the following manner. As soon as the iodine-containing cathode material, for example the cathode material 64 in FIGS. 2–4, operatively contacts a lithium element, a solid lithium-iodine electrolyte begins to form at the interface. In the present illustration this occurs at the outer or oppositely disposed surfaces of the two lithium elements 22 and 24. An electrical potential difference will exist between the anode lead 30 and cathode terminal pin 74 because casing 10 is of electrically conductive material and operatively contacts the iodine-containing material to serve as a cathode current collector. The mechanism by which the foregoing is accomplished is believed to include migration of lithium ions through the electrolyte whereby lithium is the ionic species in the cell. The exact mechanism by which the iodine-containing cathode material 64 and lithium elements 22 and 24 come into operative contact through coatings 60 and 62, respectively is not known. The mechanism could involve migration of iodine atoms or ions from material 64 through coatings 60, 62 to elements 22, 24 or migration of lithium ions from elements 22, 24 through coatings 60, 62 to material 64.

The material of coatings 60 and 62 on lithium elements 22 and 24, respectively, is an organic electron donor material of the group of organic compounds known as charge transfer complex donors. The material of the coatings can be the organic electron donor material used in preparing the charge transfer complex of the cathode material 64, but other materials can be employed. A preferred material for the coatings is polyvinyl pyridine and it is applied to the exposed surfaces of lithium elements 22 and 24 in the following manner. A solution of poly-2-vinyl pyridine polymer in anhydrous benzene or other suitable solvent is prepared. The poly-2-vinyl pyridine is readily commercially available. The solution is prepared with 2-vinyl pyridine present in the range from about 10 percent to about 20 percent by weight with a strength of about 14 percent by weight of 2-vinyl pyridine being preferred. While 2-vinyl pyridine, 4-vinyl pyridine and 3-ethyl 2-vinyl pyridine can be used, 2-vinyl pyridine is preferred because of its more fluid characteristics in solution. When the solution is prepared at a strength below about 10 percent the resulting coating can be undesirably too thin and when the solution is prepared at a strength greater than about 20 percent the material becomes difficult to apply. The solution is applied to the exposed surface of each lithium plate in a suitable manner, for example simply by application with a brush. The presence of the anhydrous benzene serves to exclude moisture thereby preventing any adverse reaction with the lithium plate. The coated anode then is exposed to a desiccant in a manner sufficient to remove the benzene from the coating. In particular the coated anode is placed in a chamber with barium oxide solid material for a time sufficient to remove the benzene, which can be in the neighborhood of 24 hours. The foregoing procedure can be repeated to provide multiple coatings or layers, for example three, on each lithium plate.

The coatings 60 and 62 on lithium elements 22 and 24, respectively, perform several important functions. One is a desirable reduction in cell impedance believed to result from a better and improved electrically effective contact area between the cathode material and each lithium element. In particular, when iodine-containing cathode material at an elevated temperature comes into contact with an uncoated lithium surface, there can be some immediate recrystallization of iodine on the lithium surface thereby blocking or preventing operative contact at that point between the lithium element and the complex of organic material and iodine. Coatings 60 and 62 serve as protective coatings to prevent this problem, functioning as buffers between the pure lithium plates and the relatively hot cathode material as it contacts the plates. There may be other mechanisms involved in the improvement of performance resulting from the use of this coating. As a result, there is provided a greater utilization of the surface of each anode element by the cathode material. In addition, the protective coatings 60, 62 permit a relatively longer handling time during construction of the cell prior to introducing the hot cathode material.

It is important that the iodine-containing material 64 is not allowed to come in contact directly with any portion of the electrical conducting means connected to the lithium members of the anode, in particular anode current collector 26 and lead 30. Otherwise, this will cause an electronic conduction between the cathode material 64 and the anode current collector 26 or lead 30 creating an electrical short circuit condition in the cell. In particular, any migration of the iodine-containing complex of material 64 directly to anode current collector 26 or directly to anode lead 30, instead of first reacting with a lithium member of the anode, will result in the condition of electronic conduction thereby creating an electrical short circuit condition in the cell. On the other hand, when the iodine-containing material 64 contacts only the lithium portion of the anode this gives rise first to a condition of ionic conduction and results in proper cell operation.

The cell construction according to the present invention advantageously prevents an electrical short circuit resulting from migration or flow of iodine-containing material 64. In particular, anode current collector 26, strip 28 and the connection to lead 30 are sealed within the sandwiched or pressure bonded assembly of lithium elements 22, 24. This seal is enhanced by the strap 40 which is of Halar or similar material which is non-reactive with iodine.

The foregoing arrangement together with insulator 32, ferrules 44, 50 and seal 54 between ferrule 44 and conductor 30 provides an anode structure which is completely sealed with the exception of the exposed lithium surface portions of the anode which are available to the cathode material 64. All parts of the anode current collector 26, strip 28 and electrical lead or conductor 30 connected thereto are shielded from the cathode material, and from the cell casing. Furthermore, the sealed assembly advantageously is completed before the entire cell is assembled, in particular before cathode material 64 is added thereto. Insulator 32 of Halar or similar material which is non-reactive with iodine surrounds and protects lead 30 between lid 17 and the current collector 26 within lithium elements 22, 24. Ferrule 44 surrounds and protects lead 30 from a point within lid 17 and within insulator portion 36 to a point outside casing 10. This is enhanced by the seal 54. The threads 38, 46 provide firm mechanical connection between insulator 32 and ferrule 44, and the threads also increase the path length for any leakage of cathode material 64 which might happen to occur between insulator 32 and ferrule 44. A relatively large path length also is provided from the end of ferrule 44 adjacent insulator portion 36 to the end of ferrule 44 adjacent seal 56.

By having all parts of anode current collector 26, strip 28 and lead 30 shielded or sealed from cathode material 64 and from the metal casing 10, no insulation is needed between the cathode material and the metal casing. The casing can be completely filled with cathode material which more than doubles the iodine content of the cell as compared to cells requiring insulation. Another advantage of the cell of the present invention is that by virtue of the foregoing arrangement, the metal casing becomes a very large cathode current collector thereby improving cell performance due to the relatively larger amount of cathode material in contact with the current collector. The foregoing provides a cell having a high energy density and this desirable characteristic is enhanced by the coatings 60, 62 of organic electron donor material. By eliminating the need for insulation between cathode material 64 and metal casing 10, the cell of the present invention can be assembled relatively quickly and economically and requires relatively fewer parts.

It is therefore apparent that the present invention accomplishes its intended objects. While several embodiments of the present invention have been described in detail, this is for the purpose of illustration, not limitation.

We claim:
1. A method of making a lithium-iodine cell comprising the steps of:
   a. providing a casing of electrically conducting material having an inner surface;
   b. providing a lithium anode having an operative surface;
   c. providing a solid element comprising a charge transfer complex of an organic electron donor material and iodine having a predetermined shape to fit relatively closely between said lithium anode operative surface and said casing inner surface;
   d. placing said solid element in operative association with a lithium anode in said casing; and
   e. heating said element while in said casing to a temperature causing said complex to flow into maximum operative contact with said anode operative surface and said casing inner surface.

2. A method according to claim 1 further including providing another solid element in operative association with said lithium anode, said elements being adjacent opposite surfaces of said anode.

3. A method according to claim 1, wherein said step of providing a solid element comprises:
   a. mixing iodine and an organic electron donor material;
   b. heating the mixture to a temperature greater than the recrystallization temperature of iodine;

c. placing the heated mixture in a mold defining said predetermined shape; and d. allowing said mixture to cool in said mold and removing the resulting solid element from said mold.

4. A method according to claim 3 further including placing said solid element in a region having a temperature of about 0° F. after said solid element is removed from said mold.

5. A method according to claim 15 further including the step of applying a coating of an organic electron donor material to said anode operative surface prior to said step of placing said solid element in operative association with said lithium anode in said casing.

6. A method according to claim 5 wherein said organic electron donor material is polyvinyl pyridine polymer.

7. A method of making a lithium-iodine cell comprising the steps of:

a. providing a casing of electrically conducting material having an inner surface and having an opening at one end thereof;

b. providing a subassembly comprising the combination of a lithium anode assembly having an anode operative surface and a lid of electrically conducting material mechanically connected to said anode assembly and electrically insulated thereform;

c. preparing cathode material by heating a mixture of iodine and an organic electron donor material to a temperature greater than the crystallization temperature of said iodine;

d. pouring said heated cathode material into said casing through said opening so as to contact said inner surface;

e. placing said subassembly including said lithium anode into said casing through said opening in a manner such that said anode operative surface is contacted by said heated cathode material and simultaneously placing said lid in said opening of said casing as said lithium anode is placed into casing to be contacted by said heated cathode material; and f. sealing the opening in said casing by welding said lid to said casing around the periphery of said lid.

8. A method according to claim 7, wherein said mixture is heated at a temperature of about 300° Fahrenheit.

9. A method according to claim 7, wherein the amount of iodine in said mixture is about 50% by weight of the mixture.

10. A method according to claim 7 further including the step of applying a coating of organic electron donor material to said operative surface of said lithium anode prior to placing said anode into said casing.

11. A method according to claim 10, wherein said organic electron donor material comprises polyvinyl pyridine polymer.

* * * * *

UNITED STATES PATENT AND TRADEMARK OFFICE
CERTIFICATE OF CORRECTION

PATENT NO. : 4,203,201
DATED : May 20, 1980
INVENTOR(S) : Ralph T. Mead, Wilson Greatbatch, Frank W. Rudolph, Norbert W. Frenz, Jr.

It is certified that error appears in the above-identified patent and that said Letters Patent are hereby corrected as shown below:

Claim 5, line 1, delete "claim 15" and substitute therefore --claim 1--.

Signed and Sealed this

Nineteenth Day of August 1980

[SEAL]

Attest:

SIDNEY A. DIAMOND

Attesting Officer

Commissioner of Patents and Trademarks